United States Patent
Park

(10) Patent No.: US 6,812,919 B1
(45) Date of Patent: Nov. 2, 2004

(54) DISPLAY DEVICE WITH POWER INTERRUPTION DELAY FUNCTION

(75) Inventor: Geun-Woo Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 08/922,300

(22) Filed: Sep. 2, 1997

(30) Foreign Application Priority Data

Aug. 30, 1996 (KR) .......................................... 96/37143

(51) Int. Cl.$^7$ ................................................ G09G 5/00
(52) U.S. Cl. ....................... 345/211; 345/212; 345/213; 345/210
(58) Field of Search ................................ 345/148, 147, 345/12, 13, 20, 210, 211, 212, 213; 315/364, 370, 371, 399, 411

(56) References Cited

U.S. PATENT DOCUMENTS

| | | | | |
|---|---|---|---|---|
| 3,555,348 A | * | 1/1971 | Martin | 315/379 |
| 4,956,587 A | * | 9/1990 | Kitou et al. | 315/408 |
| 4,994,719 A | * | 2/1991 | Lendaro | 315/411 |
| 5,021,719 A | * | 6/1991 | Arai et al. | 315/408 |
| 5,036,257 A | * | 7/1991 | Norman et al. | 325/381 |
| 5,420,484 A | * | 5/1995 | Morrish | 315/408 |
| 5,428,252 A | * | 6/1995 | Walker et al. | 307/64 |
| 5,430,596 A | * | 7/1995 | Hamaguchi et al. | 361/86 |
| 5,466,993 A | * | 11/1995 | Leaver | 315/411 |
| 5,469,029 A | * | 11/1995 | Jackson et al. | 315/408 |
| 5,606,229 A | * | 2/1997 | Jung et al. | 315/408 |
| 5,648,704 A | * | 7/1997 | Krause | 315/408 |
| 5,699,236 A | * | 12/1997 | Choi | 363/15 |
| 5,701,237 A | * | 12/1997 | Yang | 363/20 |

* cited by examiner

Primary Examiner—Marthe Y. Marc-Coleman
(74) Attorney, Agent, or Firm—Robert E. Bushnell, Esq.

(57) ABSTRACT

A display device with a power interruption delay function, comprising a power interruption delay charging circuit for gradually lowering an input voltage to an horizontal/vertical processor constant voltage circuit when power supply to the display device is interrupted. According to the present invention, when power supply is resumed under the condition that a high voltage charged on a horizontal deflection coil and an S-correction capacitor is not sufficiently discharged after power interruption, the power interruption delay charging circuit can prevent a horizontal output transistor from being damaged due to an instantaneous surge current resulting from the high voltage being not discharged.

11 Claims, 5 Drawing Sheets

INTERRUPTION TIME POINT
OF POWER SUPPLY TO
DISPLAY DEVICE

DISPLAY DEVICE WITH POWER INTERRUPTION DELAY FUNCTION

CLAIM OF PRIORITY

This application makes reference to, incorporates the same herein, and claims all benefits accruing under 35 U.S.C §119 from an application entitled Display Apparatus With Power Interruption Delay Function earlier filed in the Korean Industrial Property Office on 30 Aug. 1996, and there duly assigned Serial No. 96-37143 by that Office.

BACKGROUND OF THE INVENTION

1. Field of the Invention

The present invention relates in general to a display device employing a cathode ray tube, and more particularly to a display device with a power interruption delay function, in which a power interruption delay charging circuit is provided to prevent a horizontal output transistor from being damaged due to an instantaneous surge current generated when power supply is resumed under the condition that a high voltage charged on a horizontal deflection coil and an S-correction capacitor is not sufficiently discharged after power interruption.

2. Description of the Prior Art

Generally, a horizontal deflection circuit is supplied with power from a power supply circuit and controlled in operation by a microcomputer. Such a horizontal deflection circuit is an essential component of a display device.

Generally, in a display device a power supply circuit is adapted to convert commercial alternating current (AC) input power into direct current (DC) power to supply desired voltages to the horizontal deflection circuit and a control unit incorporating a microcomputer. The microcomputer is adapted to control the operations of the horizontal deflection circuit and the power supply circuit. The horizontal deflection circuit is adapted to horizontally deflect electron beams emitted from a cathode ray tube. An exemplary horizontal deflection circuit may include a pulse width modulation (PWM) controller for generating a PWM signal under the control of the microcomputer, a current amplifier for amplifying current in response to the PWM signal from the PWM controller, a horizontal/vertical (H/V) processor for driving a horizontal driver under the control of the microcomputer, an H/V processor constant voltage circuit for supplying a constant voltage to the H/V processor to drive it, and a horizontal output circuit for supplying current to a horizontal deflection coil and an S-correction capacitor in response to output signals from the current amplifier and horizontal driver.

The operation of the horizontal deflection circuit of the exemplary display device with the above-mentioned construction will hereinafter be described.

When the display device is powered on, the PWM controller is operated under the control of the microcomputer to output the PWM signal to the current amplifier and a high voltage from the high voltage source is transferred to the horizontal deflection coil and the S-correction capacitor.

Under the above condition, the H/V processor outputs a horizontal pulse signal of square wave to the horizontal driver under the control of the microcomputer. As a result, the high voltage charged on the horizontal deflection coil and S-correction capacitor is discharged to a ground voltage terminal.

Thereafter, when the square wave pulse signal from the H/V processor is changed from high to low in level, and the high voltage from the horizontal deflection coil and S-correction capacitor is no longer discharged.

Then, the high voltage from the high voltage source is again transferred to the horizontal deflection coil and S-correction capacitor. Hence, the above-mentioned operation is repeated.

Noticeably, the horizontal deflection coil is mounted to a neck portion of a display device so that electron beams can be deflected to the left or right according to a direction of current flowing through the coil.

The S-correction capacitor applies a parabola voltage to the horizontal deflection coil to correct a linearity of center-to-left and right sides of a screen of the display device. The S-correction capacitor also performs a DC interruption function for preventing DC current from flowing to the horizontal deflection coil.

If the power supply to the display device is interrupted during the operation of the display device, the H/V processor constant voltage circuit operates no longer due to interruption of the voltage. As a result, the H/V processor operates no longer, as well.

As the H/V processor operates no longer, it outputs no pulse signal thereby causing the high voltage charged on the horizontal deflection coil and S-correction capacitor not to be discharged. As a result, a voltage of about +120 to 160 V remains.

Under the above condition, if the power supply to the display device is resumed, the H/V processor constant voltage circuit is driven because of application of a voltage so as to operate the H/V processor, a high voltage with a very high peak value (about +1.5 to 1.8 KV) is instantaneously generated. As a result, a surge current resulting from the instantaneous high voltage abruptly flows through a discharge loop damaging a portion of the horizontal output circuit.

If the horizontal output circuit is damaged, no horizontal deflection is performed on the screen of the display device, thereby causing a single line to be vertically drawn on the center of the screen. As a result, the user cannot recognize the information displayed on the screen.

Further, the peripheral devices and circuits may successively be damaged due to a short-circuit resulting from the damage in the horizontal output circuit.

SUMMARY OF THE INVENTION

Therefore, the present invention has been made in view of the above problems, and it is an object of the present invention to provide a display device with a power interruption delay function, in which a power interruption delay charging circuit is provided to prevent a horizontal output transistor from being damaged due to an instantaneous surge current generated when power supply is resumed under the condition that a high voltage charged on a horizontal deflection coil and an S-correction capacitor is not sufficiently discharged after power interruption.

In accordance with the present invention, the above and other objects can be accomplished by a provision of a display device with a power interruption delay function, comprising a pulse width modulation controller for generating a pulse width modulation signal under the control of a microcomputer; a current amplifier for amplifying current in response to the pulse width modulation signal from the pulse width modulation controller; an H/V processor for generating a square wave pulse signal under the control of the microcomputer; a horizontal driver for generating a drive pulse signal in response to the square wave pulse signal from the H/V processor; a horizontal deflection coil for horizontally deflecting electron beams; an S-correction capacitor connected in series to the horizontal deflection coil, for correcting a linearity of center-to-left and right sides of a screen; a horizontal output circuit for charging and discharging energy on the horizontal deflection coil and S-correction capacitor in response to an output signal from the current amplifier and the drive pulse signal from the horizontal driver; an H/V processor constant voltage circuit for supplying a constant voltage to the H/V processor; and power interruption delay charging means for gradually lowering an input voltage to the H/V processor constant voltage circuit when power supply to the display device is interrupted.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
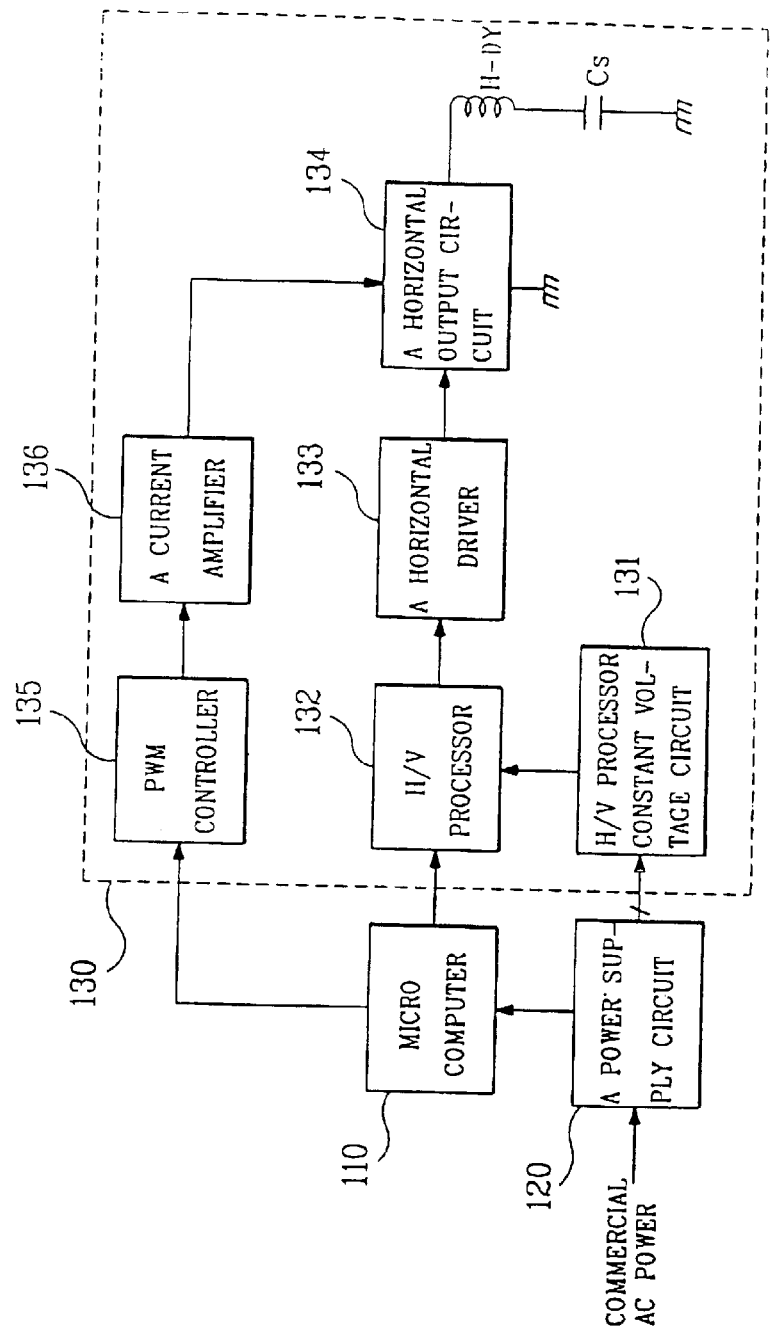
FIG. 1 is a schematic block diagram illustrating the construction of a horizontal deflection circuit of a display device.

FIG. 1 is a schematic block diagram illustrating the construction of a horizontal deflection circuit of a display device. In this drawing, the reference numeral 110 designates a microcomputer, 120 designates a power supply circuit and 130 designates a horizontal deflection circuit.

The power supply circuit 120 is adapted to convert commercial alternating current (AC) input power into direct current (DC) power to supply desired voltages to the horizontal deflection circuit 130 and the microcomputer 110.

The microcomputer 110 is adapted to control the operations of the horizontal deflection circuit 130 and power supply circuit 120.

The horizontal deflection circuit 130 is adapted to horizontally deflect electron beams emitted from a cathode ray tube.

The horizontal deflection circuit 130 includes a pulse width modulation (PWM) controller 135 for generating a PWM signal under the control of the microcomputer 110, a current amplifier 136 for amplifying current in response to the PWM signal from the PWM controller 135, an H/V processor 132 for driving a horizontal driver 133 under the control of the microcomputer 110, an H/V processor constant voltage circuit 131 for supplying a constant voltage to the H/V processor 132 to drive it, and a horizontal output circuit 134 for supplying current to a horizontal deflection coil H-DY and an S-correction capacitor Cs in response to output signals from the current amplifier 136 and horizontal driver 133.

Figure 2:
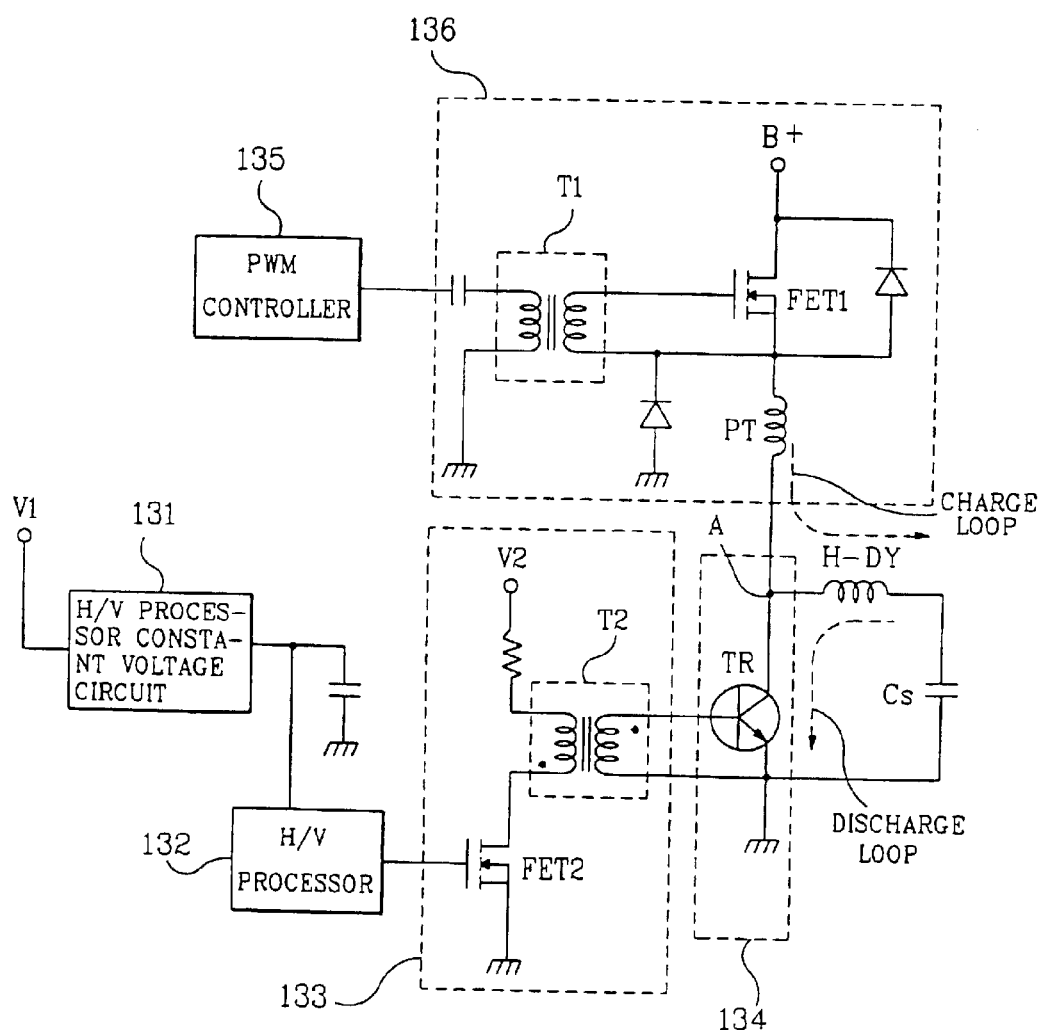
FIG. 2 is a detailed circuit diagram of the horizontal deflection circuit of the display device in FIG. 1.

FIG. 2 is a detailed circuit diagram of the horizontal deflection circuit 130 of the display device in FIG. 1. As shown in this drawing, the current amplifier 136 includes a current amplification transformer T1 having primary and secondary coils, and a field effect transistor FET1 having its gate terminal connected to the secondary coil of the current amplification transformer T1. The primary coil of the current amplification transformer T1 has its one side connected to an output terminal of the PWM controller 135 through a capacitor and its other side connected to a ground voltage terminal. The field effect transistor FET1 also has its drain terminal connected to a high voltage source B+ and its source terminal connected in common to one side of the horizontal deflection coil H-DY and a collector terminal of a horizontal output transistor TR in the horizontal output circuit 134 through a pulse transformer PT. The other side of the horizontal deflection coil H-DY is connected to one side of the S-correction capacitor Cs, the other side of which is connected to the ground voltage terminal.

The H/V processor constant voltage circuit 131 has its input terminal connected to a voltage source V1 and its output terminal connected in common to an input terminal of the H/V processor 132 and one side of a capacitor, the other side of which is connected to the ground voltage terminal. The horizontal driver 133 includes a field effect transistor FET2 having its gate terminal connected to an output terminal of the H/V processor 132 and its source terminal connected to the ground voltage terminal, and a horizontal drive transformer T2 having primary and secondary coils. The primary coil of the horizontal drive transformer T2 has its one side connected to a voltage source V2 through a resistor and its other side connected to a drain terminal of the field effect transistor FET2. The secondary coil of the horizontal drive transformer T2 has its one side connected to a base terminal of the horizontal output transistor TR in the horizontal output circuit 134, the emitter terminal of which is connected to the ground voltage terminal, and its other side connected to the ground voltage terminal.

The operation of the horizontal deflection circuit 130 of the display device with the above-mentioned construction will hereinafter be described.

When the display device is powered on, the PWM controller 135 is operated under the control of the microcomputer 110 to output the PWM signal to the current amplifier 136. In the current amplifier 136, the current amplification transformer T1 is excited in response to the PWM signal from the PWM controller 135 to drive the field effect transistor FET1 connected to the secondary coil thereof. As the field effect transistor FET1 is driven, a high voltage from the high voltage source B+ connected to the drain terminal of the transistor FET1 is transferred to the horizontal deflection coil H-DY and S-correction capacitor Cs through the pulse transformer PT to be charged thereon.

Under the above condition, the H/V processor 132 outputs a horizontal pulse signal of square wave to the horizontal driver 133 under the control of the microcomputer 110. In the horizontal driver 133, the field effect transistor FET2 is turned on when the square wave pulse signal from the H/V processor 132 is high in level, to excite the horizontal drive transformer T2. As a result, a voltage is induced in the secondary coil of the horizontal drive transformer T2, thereby causing the horizontal output transistor TR in the horizontal output circuit 134 to be turned on. As the horizontal output transistor TR is turned on, it discharges the high voltage charged on the horizontal deflection coil H-DY and S-correction capacitor Cs to the ground voltage terminal therethrough.

Thereafter, when the square wave pulse signal from the H/V processor 132 is changed from high to low in level, the field effect transistor FET2 and the horizontal output transistor TR are successively turned off. As a result, the high voltage from the horizontal deflection coil H-DY and S-correction capacitor Cs is no longer discharged.

Then, the high voltage from the high voltage source B+ is again transferred to the horizontal deflection coil H-DY and S-correction capacitor Cs through the field effect transistor FET1 and pulse transformer PT in the current amplifier 136 to be charged thereon. Hence, the above-mentioned operation is repeated.

Noticeably, the horizontal deflection coil H-DY is mounted to a neck portion (not shown) of the display device so that electron beams emitted from the cathode ray tube can be deflected to the left or right according to a direction of current flowing through the coil H-DY.

The S-correction capacitor Cs applies a parabola voltage to the horizontal deflection coil H-DY to correct a linearity of center-to-left and right sides of a screen of the display device. The S-correction capacitor Cs also performs a DC interruption function for preventing DC current from flowing to the horizontal deflection coil H-DY.

Figure 4A:
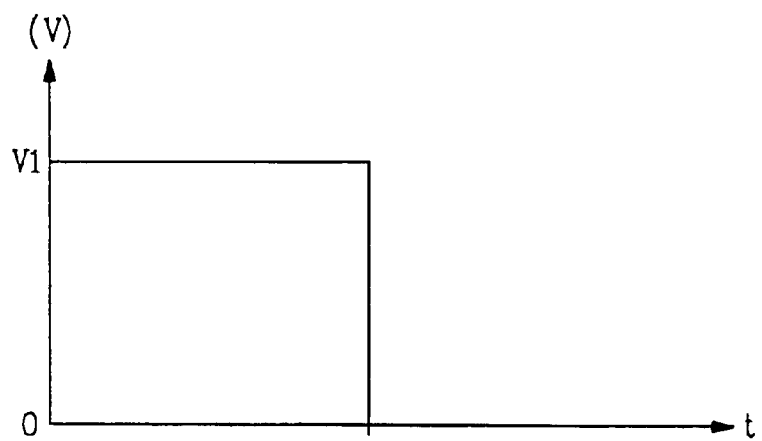
FIGS. 4a and 4b are waveform diagrams showing comparison between inputs to H/V processor constant voltage circuits in FIGS. 2 and 3.

If the power supply to the display device is interrupted during the operation of the display device, the H/V processor constant voltage circuit 131 operates no longer due to interruption of the voltage V1 as shown in FIG. 4a. As a result, the H/V processor 132 operates no longer, as well.

Figure 5A:
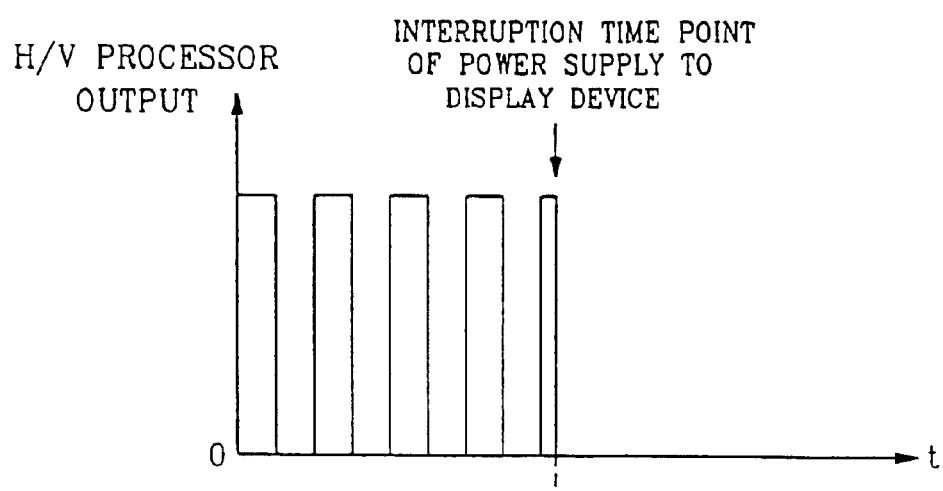
FIGS. 5a and 5b are waveform diagrams showing comparison between outputs of H/V processors in FIGS. 2 and 3.

As the H/V processor 132 no longer operates, it outputs no pulse signal as shown in FIG. 5a, thereby causing the high voltage charged on the horizontal deflection coil H-DY and S-correction capacitor Cs not to be discharged. As a result, a voltage of about +120 to 160V remains at a node A of the collector terminal of the horizontal output transistor TR.

Under the above condition, if the power supply to the display device is resumed, the H/V processor constant voltage circuit 131 is driven because of application of the voltage V1, so as to operate the H/V processor 132. As a result, the horizontal output transistor TR is operated.

At this time, a high voltage with a very high peak value (about +1.5 to 1.8 KV) is instantaneously generated at the collector terminal of the horizontal output transistor TR. As a result, a surge current resulting from the instantaneous high voltage abruptly flows through a discharge loop including the horizontal output transistor TR, thereby causing the horizontal output transistor TR to be damaged.

If the horizontal output transistor TR in the horizontal output circuit 134 is damaged, no horizontal deflection is performed on the screen of the display device, thereby causing a single line to be vertically drawn on the center of the screen. As a result, the user cannot recognize the information displayed on the screen.

Further, the peripheral devices and circuits may successively be damaged due to a short-circuit resulting from the damage in the horizontal output transistor TR.

Figure 3:
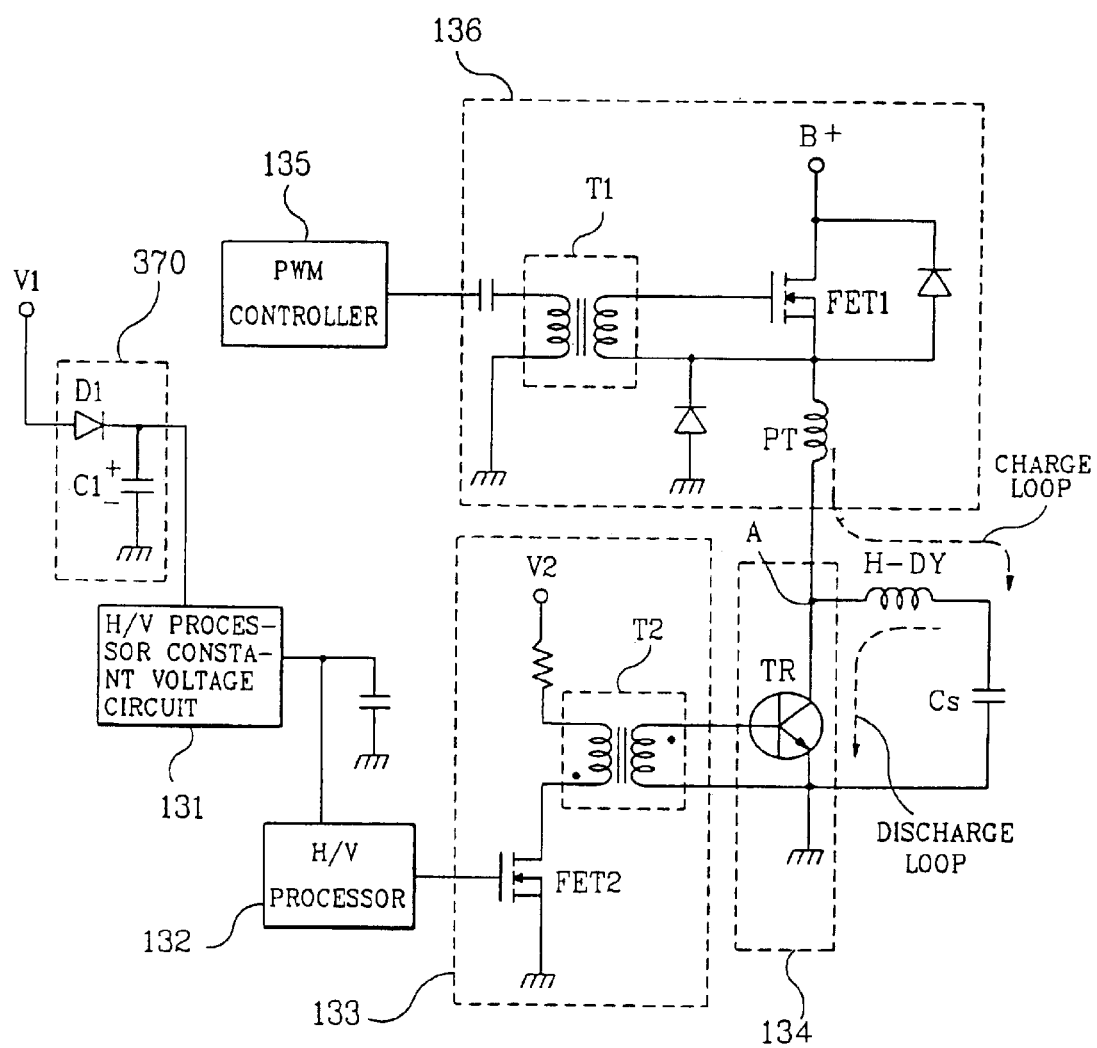
FIG. 3 is a detailed circuit diagram illustrating the construction of a display device with a power interruption delay function in accordance with the principles of the present invention.

FIG. 3 is a detailed circuit diagram illustrating the construction of a display device with a power interruption delay function in accordance with the present invention. The construction of this drawing is the same as that of FIG. 2, with the exception that a power interruption delay charging circuit 370 is provided according to the present invention. Therefore, like reference numerals designate like parts and a detailed description thereof will thus be omitted.

In the display device of FIG. 2, the voltage source V1 is connected directly to the input terminal of the H/V processor constant voltage circuit 131. However, in the display device of FIG. 3, the voltage source V1 is connected to the input terminal of the H/V processor constant voltage circuit 131 through the power interruption delay charging circuit 370.

The power interruption delay charging circuit 370 includes a reverse voltage prevention diode D1 having its anode connected to the voltage source V1 and its cathode connected to the input terminal of the H/V processor constant voltage circuit 131, and a polarity capacitor C1 having its positive pole connected to a connection point of the cathode of the reverse voltage prevention diode D1 and the input terminal of the H/V processor constant voltage circuit 131 and its negative pole connected to the ground voltage terminal.

The operation of the display device with the above-mentioned construction in accordance with the present invention will hereinafter be described in detail.

When the display device is powered on, the high voltage from the high voltage source B+ is charged on the horizontal deflection coil H-DY and S-correction capacitor Cs through the field effect transistor FET1 and pulse transformer PT in the current amplifier 136 and then discharged through the discharge loop including the horizontal output transistor TR in the horizontal output circuit 134. Such charging and discharging operations are repeated as stated previously with reference to FIG. 2.

Figure 4B:
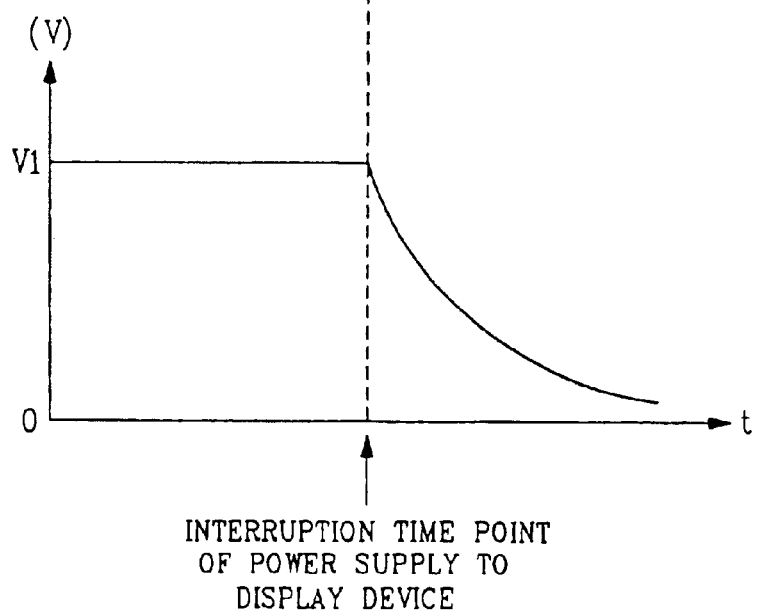

If the power supply to the display device is interrupted during the operation of the display device, the voltage supply to the H/V processor constant voltage circuit 131 is at once stopped in the display device of FIG. 2, as shown in FIG. 4a. However, according to the present invention, a voltage, charged on the polarity capacitor C1 during the power supply, is applied to the input terminal of the H/V processor constant voltage circuit 131, as shown in FIG. 4b, while it is discharged. As a result, the H/V processor constant voltage circuit 131 does not immediately stop the voltage supply to the H/V processor 132.

Noticeably, the reverse voltage prevention diode D1 is connected in series between the voltage source V1 and the H/V processor constant voltage circuit 131 to protect the power supply circuit by allowing the voltage charged on the polarity capacitor C1 not to be discharged to the voltage source V1 at the power interruption state.

Figure 5B:
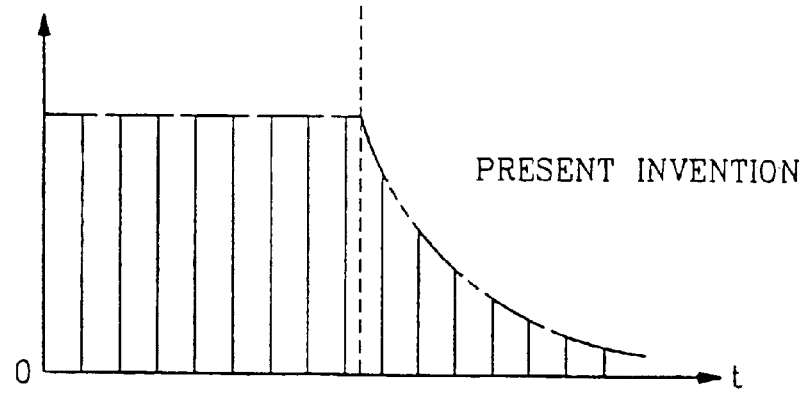

Because the voltage charged on the polarity capacitor C1 is continuously applied to the H/V processor constant voltage circuit 131 until it is completely discharged, the voltage supply to the H/V processor 132 is not interrupted immediately. Therefore, the H/V processor 132 outputs the horizontal pulse signal continuously for a predetermined time period, as shown in FIG. 5b.

The continuous pulse output time of the H/V processor 132 is determined according to a discharge time of the polarity capacitor C1. As a result, the continuous pulse output time of the H/V processor 132 can be varied by adjusting the discharge time of the polarity capacitor C1.

While the output pulse from the H/V processor 132 maintains such a high voltage level as to continuously drive the field effect transistor FET2 in the horizontal driver 133, the horizontal drive transformer T2 continues to be excited to induce a voltage in its secondary coil, thereby causing the horizontal output transistor TR in the horizontal output circuit 134 to remain at its driven state. Hence, the high voltage charged on the horizontal deflection coil H-DY and S-correction capacitor Cs can be sufficiently discharged. Namely, the discharge time of the high voltage charged on the horizontal deflection coil H-DY and S-correction capacitor Cs is sufficient.

As apparent from the above description, according to the present invention, the power interruption delay charging circuit is provided at the input terminal of the H/V processor constant voltage circuit in the display device. The power interruption delay charging circuit can prevent the horizontal output transistor from being damaged due to an instantaneous surge current when power supply is resumed after power interruption. Further, the power interruption delay charging circuit can prevent the peripheral devices and circuits from being successively damaged due to damage in the horizontal output transistor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display device with a power interruption delay function, comprising:
    a pulse width modulation controller for generating a pulse width modulation signal under the control of a microcomputer;
    a current amplifier for amplifying current in response to the pulse width modulation signal from said pulse width modulation controller;
    a horizontal/vertical processor for generating a square wave pulse signal under the control of said microcomputer;
    a horizontal driver for generating a drive pulse signal in response to the square wave pulse signal from said horizontal/vertical processor;
    a horizontal deflection coil for horizontally deflecting electron beams generated in said display device;
    a S-correction capacitor connected in series between said horizontal deflection coil and a ground terminal, for correcting a linearity of center-to-left and right sides of a screen;
    a horizontal output circuit for charging and discharging energy on said horizontal deflection coil and said S-correction capacitor in response to an output signal from said current amplifier and said drive pulse signal from said horizontal driver;
    a horizontal/vertical processor constant voltage circuit for supplying a constant voltage to said horizontal/vertical processor in response to an input voltage; and
    power interruption delay charging means for gradually lowering said input voltage to said horizontal/vertical processor constant voltage circuit to enable said horizontal output circuit to discharge the energy on said horizontal deflection coil and S-correction capacitor thereby preventing damage to the horizontal output circuit when power supplied to said display device is interrupted.

2. The display device as set forth in claim 1, wherein said power interruption delay charging means includes:
    a polarity capacitor for performing a charging operation when power is supplied to said display device and a discharging operation when the power supplied to said display device is interrupted; and
    a diode connected to said polarity capacitor, for preventing a voltage charged on said polarity capacitor from being discharged to a power supply circuit when the power supplied to the display device is interrupted.

3. A display device with a power interruption delay function, comprising:
    a power supply circuit for converting a received commercial alternating current power into a direct current input voltage;
    a horizontal deflection circuit under the control of a microcomputer, receiving said direct current input voltage, for horizontally deflecting electron beams generated in said display device; and
    power interruption delay charging means for gradually lowering said direct current input voltage received by said horizontal deflection circuit to enable said horizontal output circuit to discharge the energy on said horizontal deflection coil and S-correction capacitor thereby preventing damage to the horizontal output circuit when said alternating current power supplied to said power supply circuit is interrupted, said power interruption delay charging means comprising:
        a polarity capacitor for performing a charging operation when said alternating current power is supplied and a discharging operation when said alternating current power is interrupted; and
        a diode connected to said polarity capacitor, for preventing a voltage charged on said polarity capacitor from being discharged to said power supply circuit when said alternating current power is interrupted.

4. The display device as set forth in claim 3, wherein said horizontal deflection circuit comprises:
    a pulse width modulation controller for generating a pulse width modulation signal under the control of said microcomputer;
    a current amplifier for amplifying current in response to said pulse width modulation signal generated by said pulse width modulation controller;
    a horizontal/vertical processor for generating a square wave pulse signal under the control of said microcomputer;
    a horizontal driver for generating a drive pulse signal in response to the square wave pulse signal from said horizontal/vertical processor;
    a horizontal deflection coil for horizontally deflecting said electron beams;
    a S-correction capacitor connected in series between said horizontal deflection coil and a ground terminal, for correcting a linearity of center-to-left and right sides of a screen;
    a horizontal output circuit for charging and discharging energy on said horizontal deflection coil and said S-correction capacitor in response to an output signal from said current amplifier and said drive pulse signal from said horizontal driver; and
    a horizontal/vertical processor constant voltage circuit for supplying a constant voltage to said horizontal/vertical processor in response to said direct current input voltage, said direct current input voltage being received through said power interruption delay charging means.

5. The display device as set forth in claim 4, wherein said current amplifier comprises:
    a current amplification transformer having a primary coil and a secondary coil;
    a field effect transistor having its gate terminal connected to one terminal of said secondary coil;

one terminal of said primary coil being connected to an output terminal of said pulse width modulation controller through a capacitor and another terminal of said primary coil being connected to said ground terminal;

said field effect transistor having a drain terminal connected to a high voltage source and a source terminal connected in common to a second terminal of said secondary coil and one side of a pulse transformer;

said pulse transformer having a second side connected to one side of said horizontal deflection coil;

a first diode connected between said source terminal and said drain terminal; and a second diode connected between said second terminal of said secondary coil and said ground terminal.

6. The display device as set forth in claim 5, wherein said horizontal output circuit comprises a horizontal output transistor having a collector terminal connected in common to said second side of said pulse transformer and said one side of said horizontal deflection coil, an emitter terminal connected to said S-correction capacitor and said ground terminal, and a base terminal connected to an output terminal of said horizontal driver for receiving said drive pulse signal.

7. The display device as set forth in claim 6, wherein said horizontal driver comprises:

a second field effect transistor having a gate terminal connected to receive said square wave pulse signal from said horizontal/vertical processor, a source terminal connected to said ground terminal, and a drain terminal;

a horizontal drive transformer having a primary coil and a secondary coil, said primary coil having one terminal connected to a voltage source through a resistor and a second terminal connected to said drain terminal of said second field effect transistor; and said secondary coil of said horizontal drive transformer having one side connected to said base terminal of said horizontal output transistor and a second side connected to said ground terminal.

8. A display device with a power interruption delay function, comprising:

a pulse width modulation controller for generating a pulse width modulation signal under the control of a microcomputer;

a horizontal deflection coil for horizontally deflecting electron beams generated in said display device;

a current amplification transformer having a primary coil and a secondary coil;

a field effect transistor having its gate terminal connected to one terminal of said secondary coil;

one terminal of said primary coil being connected to an output terminal of said pulse width modulation controller through a capacitor and another terminal of said primary coil being connected to a ground terminal;

said field effect transistor having a drain terminal connected to a high voltage source and a source terminal connected in common to a second terminal of said secondary coil and one side of a pulse transformer;

said pulse transformer having a second side connected to one side of said horizontal deflection coil;

a first diode connected between said source terminal and said drain terminal; and a second diode connected between said second terminal of said secondary coil and said ground terminal;

a H/V processor for generating a square wave pulse signal under the control of said microcomputer;

a horizontal driver for generating a drive pulse signal in response to the square wave pulse signal from said H/V processor;

an S-correction capacitor connected in series between said horizontal deflection coil and a ground terminal, for correcting a linearity of center-to-left and right sides of a screen;

a horizontal output circuit for charging and discharging energy on said horizontal deflection coil and said S-correction capacitor in response to an output signal from said current amplifier and said drive pulse signal from said horizontal driver;

a H/V processor constant voltage circuit for supplying a constant voltage to said H/V processor in response to an input voltage; and power interruption delay charging means for gradually lowering said input voltage to said H/V processor constant voltage circuit to enable said horizontal output circuit to discharge the energy on said horizontal deflection coil and S-correction capacitor thereby preventing damage to the horizontal output circuit when power supplied to said display device is interrupted.

9. The display device as set forth in claim 8, wherein said power interruption delay charging means includes:

a polarity capacitor for performing a charging operation when power is supplied to said display device and a discharging operation when the power supplied to said display device is interrupted; and a diode connected to said polarity capacitor, for preventing a voltage charged on said polarity capacitor from being discharged to a power supply circuit when the power supplied to the display device is interrupted.

10. The display device as set forth in claim 8, wherein said horizontal output circuit comprises a horizontal output transistor having a collector terminal connected in common to said second side of said pulse transformer and said one side of said horizontal deflection coil, an emitter terminal connected to said S-correction capacitor and said ground terminal, and a base terminal connected to an output terminal of said horizontal driver for receiving said drive pulse signal.

11. The display device as set forth in claim 10, wherein said horizontal driver comprises:

a second field effect transistor having a gate terminal connected to receive said square wave pulse signal from said H/V processor, a source terminal connected to said ground terminal, and a drain terminal;

a horizontal drive transformer having a primary coil and a secondary coil, said primary coil having one terminal connected to a voltage source through a resistor and a second terminal connected to said drain terminal of said second field effect transistor; and said secondary coil of said horizontal drive transformer having one side connected to said base terminal of said horizontal output transistor and a second side connected to said ground terminal.

* * * * *